Patented Dec. 4, 1945

2,390,480

UNITED STATES PATENT OFFICE 2,390,480

METALLIZED AZO TRIAZOLES

Byron L. West, Plainfield, N. J., assignor to American Cyanamid Company, New York, N. Y., a corporation of Maine No Drawing. Application June 16, 1943, Serial No. 491,049

4 Claims. (Cl. 260—146)

This invention relates to metallized disazo dyes containing the diphenyl group.

Blue and blue-green dyes metallized with copper have been prepared by metallizing the disazo dye obtained from tetrazotized dianisidine and Chicago acid. These dyes do not have quite the desired shade or fastness to light after crease-proofing. Various attempts have been made to produce blue dyes by metallizing with copper dyes from tetrazotized dianisidine and H acid. These dyes are not sufficiently fast to light because the amino groups on the coupling components are unprotected. It is, of course, feasible to protect the amino groups by acylation in the well-known manner, but unfortunately the dyes thus obtained are reddish-blue, which is undesirable.

It has been found, according to the present invention, that dyes of the desired shade and good light fastness may be prepared from tetrazotized dianisidine, or other benzidine derivatives which have metallizable groups ortho to the amino groups, by coupling with one or two moles of the azo dye obtained by acid coupling diazotized metanilic acid onto 1-amino-8-naphthol-4-sulfonic acid ("S acid"). When these dyes are metallized by the aid of alkaline copper solutions this treatment results also in an oxidation of the coupling component to form a triazole. It is an advantage of the present invention that the metallization may be effected without special equipment. However, if desired the metallization may be effected in a closed vessel under pressure which permits using somewhat higher temperatures. The products of the present invention are copper complexes of azo dyes represented in general by the following formula:

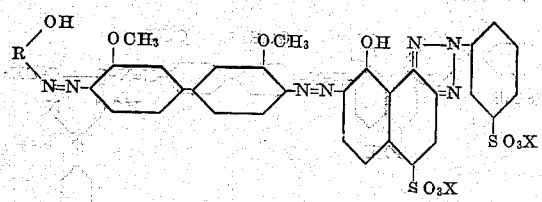

in which R is the radical of a coupling component, the hydroxyl group being ortho to the azo group, and X is hydrogen or a metal, such as e. g. an alkali metal.

The present invention is not limited in its broader aspects to dyes containing the S acid triazole radical as one coupling component only or as both coupling components. However, the best commercial color is one in which one end component only is the S acid triazole radical and the other component Chicago acid. This color is a copper complex of the dyestuff:

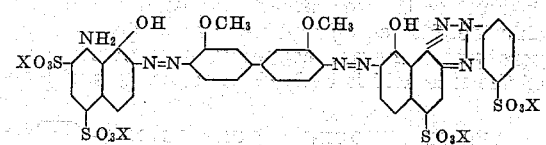

where X has the same meaning as in the preceding formula.

Many of the preferred dyes of the present invention have the surprising property of being resistant to the effects of crease proofing. Many otherwise fast dyes when subjected to crease proofing treatment with various synthetic resins of the aldehyde amide type show loss of light fastness or undergo change of shade. Because of the growing importance of this type of textile finishing in the case of cellulosic textiles, for which the dyes of the present invention are particularly useful, this property represents an important practical advantage. The present invention is not limited in any way to any theory of why the improved light fastness and shade fastness after crease proofing results.

As has been pointed out above the preferred dye according to the present invention is the one in which the S acid triazole radical is one end component and Chicago acid the other. However, many useful dyes can be prepared in which the Chicago acid is replaced by other coupling components which have a metallizable group ortho to the azo group, such as various naphthols, for instance β-naphthol, 1-phenyl-3-methyl-5-pyrazolone, aceto-acetanilide, 2-naphthol sulfonic acids, acetoacetanisidide, phenol, and the like.

The invention will be described in greater detail in conjunction with the following specific examples in which the parts are by weight.

Example 1

40.3 parts of the dyestuff of the formula:

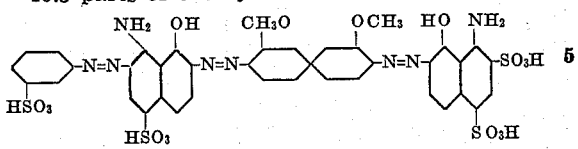

made by coupling tetrazotized dianisidine on one side to the azo dyestuff of the following formula:

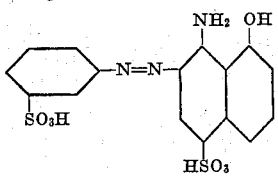

and on the other side to 1-amino-8-naphthol-2,4-disulfonic acid (Chicago acid) are dissolved in 1,100 parts of hot water.

In a separate vessel provided with cooling bath or coil 45.0 parts of concentrated ammonium hydroxide solution (containing 12.6 parts of $NH_3$) are added to a solution of 40 parts of crystalline copper sulfate ($CuSO_4.5H_2O$) in 60 parts of water.

The ammoniacal copper sulfate solution is added to the dye solution, and the whole is then heated and stirred at 80–90° C. in a reflux apparatus until no further color change takes place. This operation usually requires 15–20 hours. If necessary, concentrated ammonium hydroxide solution is added occasionally to insure that an excess of ammonium hydroxide is present in the solution. When the reaction is complete, the new dyestuff is isolated by the addition of sodium chloride, filtered off and dried at moderate temperatures. The new copper complex in the form of the free acid is derived from the dyestuff:

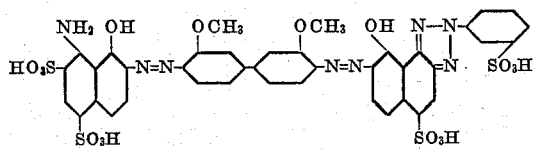

It dyes cotton, rayon and other cellulosic fibers greenish blue shades having excellent fastness to light. It retains its attractive blue shade and light fastness even after the fibers are treated with the usual agents of the aldehyde amine type used to render the fabric creaseproof.

Example 2

111.2 parts of the dyestuff of the formula:

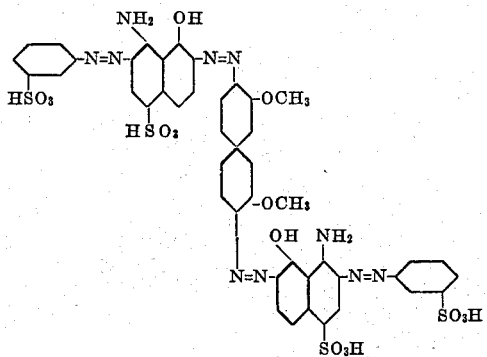

obtained by coupling tetrazotized dianisidine on both sides to the azo dyestuff of the formula:

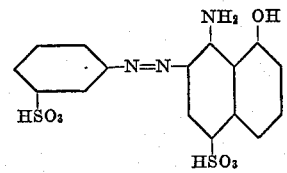

are dissolved in 3,000 parts of water. A solution of 125 parts of crystalline copper sulfate ($CuSO_4.5H_2O$) in 600 parts of warm water is added. Then 450 parts of concentrated ammonium hydroxide solution, containing 126 parts of $NH_3$, are added. The solution is then heated at 80–85° C. in an apparatus provided with a reflux condenser until no further color change takes place. This operation usually requires 10 to 20 hours. During this heating period, ammonium hydroxide solution is added from time to time as needed to insure that an excess of ammonia is present in solution. The dye is isolated by the addition of sodium chloride, filtered off and dried. The new product is a copper complex of a dyestuff the free acid of which has the following formula:

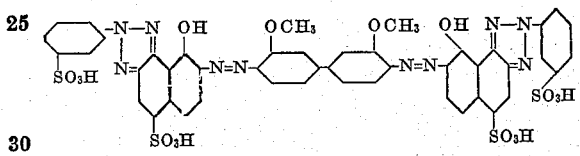

This new dye is soluble in water and gives bluish grey shades on cotton, rayon and other cellulosic fibers having good fastness properties.

Example 3

37.7 parts of the dyestuff of the formula:

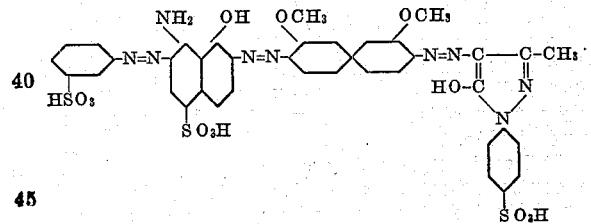

obtained by coupling tetrazotized dianisidine on one side to the dyestuff of the formula:

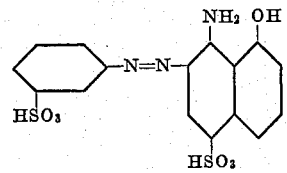

and on the other side to 1-(4'-sulfo phenyl)-3-methyl-5-pyrazolone, is heated with an ammoniacal solution of copper sulfate made from 40 parts of $CuSO_4.5H_2O$ by the procedure outlined in Example 1. The product obtained is a complex copper containing dye. The product obtained is the copper complex derived from a dyestuff which in the form of its free acid has the formula:

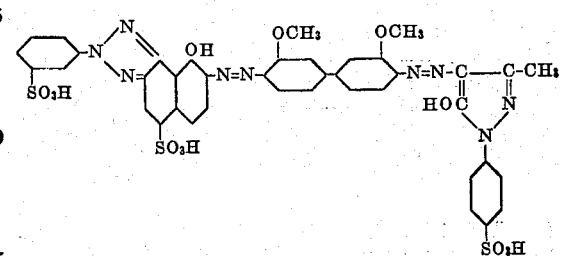

It dyes cotton and other cellulosic fibers violet to brown-violet shades.

By substituting for 1-(4'-sulfophenyl)-3-methyl-5-pyrazolone in this example an equivalent amount of acetoacetanilide, a copper containing dyestuff is obtained which gives yellower shades on cotton and other cellulosic fibers.

In the formulae described above the azo dyestuff is represented in the form in which it is reacted with the copper compound. During the reaction the methoxy groups are hydrolyzed and the final complex therefore does not contain either of the two methyl groups originally on the dianisidine portion of the molecule.

I claim:

1. Copper complexes obtained from disazo dyes having the formula:

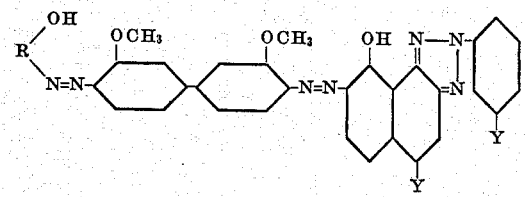

in which R is the residue of a coupling component, the hydroxyl group and the nitrogen being ortho to each other, and Y is a member of the group consisting of the sulfonic acid group and its salts.

2. Copper complexes of disazo dyes having the formula:

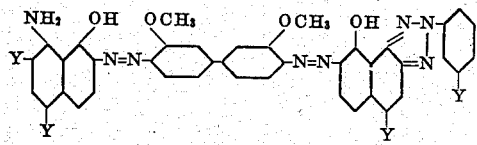

in which Y is a member of the group consisting of the sulfonic acid group and its salts.

3. A method of producing copper complexes derived from azo dyes having the following formula:

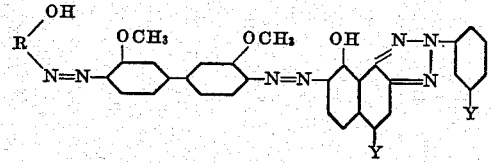

in which R is the residue of a coupling component, the hydroxyl groups and the nitrogen being ortho to each other, and Y is a member of the group consisting of sulfonic acid and its salts, which comprises subjecting the unmetallized disazo dyes having the following formula:

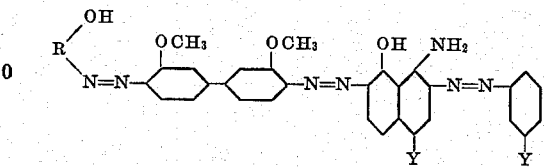

where R and Y have the same meaning as above, to the action of copper compounds whereby simultaneous formation of the copper complex and oxidation with formation of a triazole takes place.

4. A method of producing copper complexes derived from azo dyes having the formula:

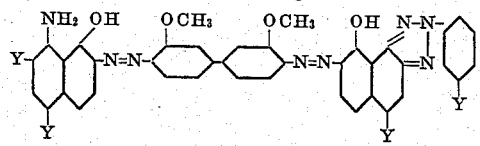

in which Y is a member of the group consisting of sulfonic acid and its salts which comprises subjecting disazo dyes having the formula:

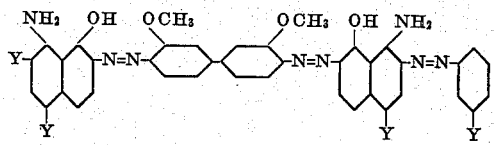

in which Y has the same meaning as above, to the action of copper compounds whereby simultaneous hydrolysis of the methoxy group complex formula and oxidation with triazol formation takes place.

BYRON L. WEST.